UNITED STATES PATENT OFFICE.

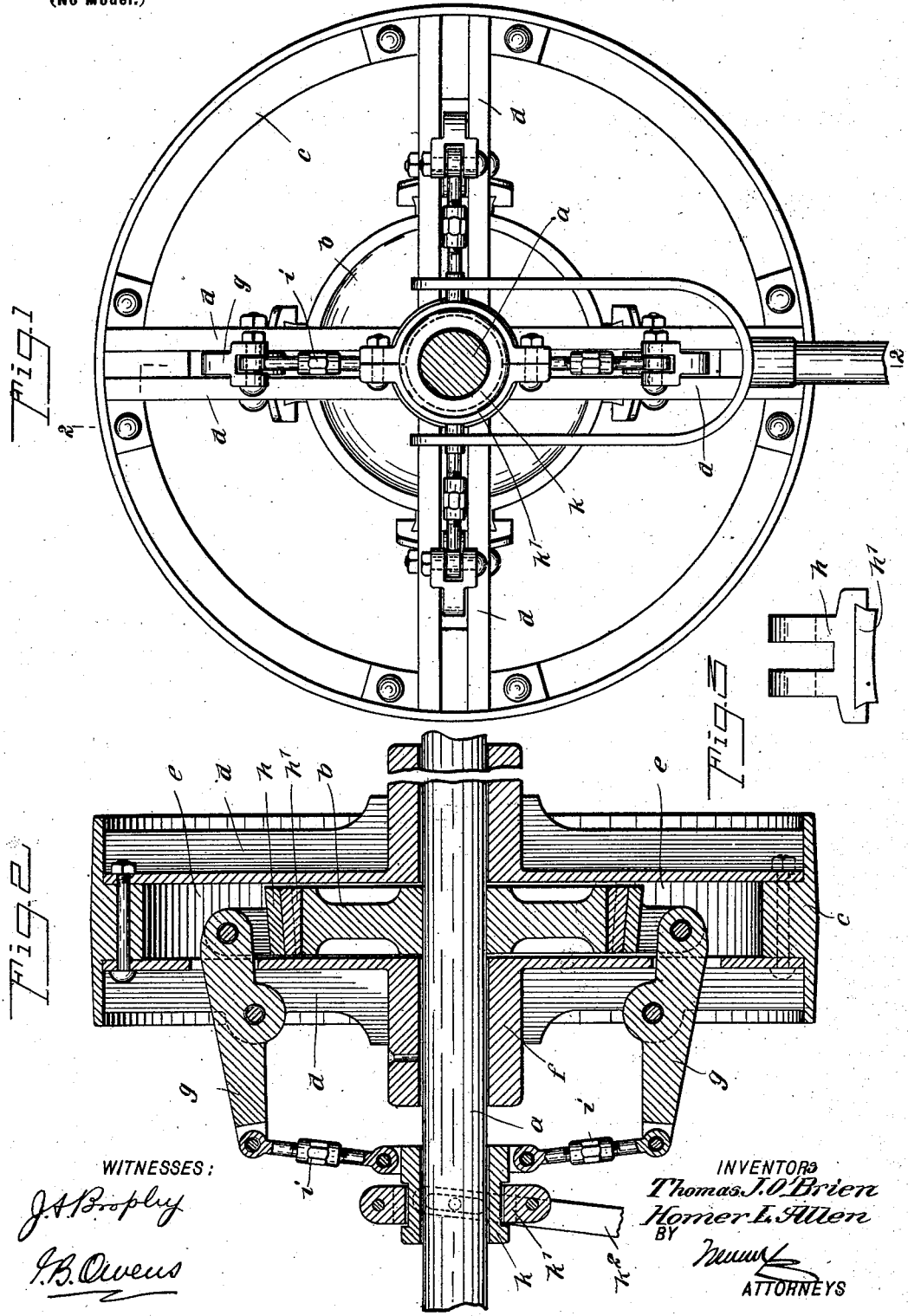

THOMAS J. O'BRIEN AND HOMER L. ALLEN, OF CAIRO, ILLINOIS.

CLUTCH-PULLEY.

SPECIFICATION forming part of Letters Patent No. 698,313, dated April 22, 1902.

Application filed May 17, 1901. Serial No. 60,701. (No model.)

*To all whom it may concern:*

Be it known that we, THOMAS J. O'BRIEN and HOMER L. ALLEN, citizens of the United States, and residents of Cairo, in the county of Alexander and State of Illinois, have invented a new and Improved Clutch-Pulley, of which the following is a full, clear, and exact description.

This invention relates to a clutch-pulley which is provided with a web having a cavity therein receiving a disk fastened to the shaft, the wheel turning freely on the shaft, and supporting clutch devices for engaging the disk, whereby to connect the wheel with the shaft.

This specification is a specific description of one form of the invention, while the claim is a definition of the actual scope thereof.

Reference is to be had to the accompanying drawings, forming a part of this specification, in which similar characters of reference indicate corresponding parts in all the views.

Figure 1 is an elevational view of the pulley, showing the shaft in section. Fig. 2 is a section on the line 2 2 of Fig. 1, and Fig. 3 is a detail view of one of the clutches.

$a$ indicates the shaft, and $b$ indicates the clutch-disk which is fastened thereto.

$c$ indicates the rim of the pulley, which may be formed of any material desired and in any manner. The web of the pulley is made up of a number of spokes $d$, arranged in pairs, the members of which are separated from each other to form an annular cavity $e$ within the web of the wheel. These spokes $d$ are fastened to the rim $c$ and extend inward to the two hubs $f$, to which the spokes are fastened rigidly or formed integral therewith, as desired. The hubs $f$ are mounted loosely on the shaft $a$ and may be provided at suitable or desired points with lubricating devices. The clutch-disk $b$ is situate in the cavity $e$, and the pulley is thus given firm bearing on the shaft at each side of the disk, so that the strain on the pulley is borne evenly thereby and there is no danger of twisting the pulley on the shaft.

$g$ indicates a series of levers, which are here shown to be four in number and which are fulcrumed on certain of the spokes $d$. These levers have their inner ends projected into the cavity $e$ and carry clutch members $h$, provided with working faces $h'$, of leather or other analogous material. The outer ends of the levers $g$ are connected with turnbuckles $i$, the turnbuckles and levers forming toggles, which are actuated by a sleeve $k$, sliding on the shaft $a$ and provided with a collar $k'$, engaged by the operating-lever $k^2$ in the usual manner.

By throwing the toggle formed by the parts $i$ and $g$ the clutch members $h$ may be engaged with the disk $g$, and thus the wheel or pulley will be fastened to the shaft. Upon disengaging the clutch members from the disk the pulley will be rendered loose. When the pulley is out of gear, the pulley itself not only stands still, but all of the clutch devices, and therefore the parts are exposed and may be adjusted at will notwithstanding that the shaft $a$ may be turning rapidly.

The disk $b$ also serves to hold the pulley on the shaft, it being necessary to fasten the disk only to the shaft. The parts are assembled by first placing the disk in position and then building up the pulley around it. It is immaterial as to what form the web of the pulley assumes—that is to say, whether it be formed of spokes, as illustrated in the drawings, or whether it be formed of two continuous plates or disks provided with openings for the passage of the levers $g$.

Having thus described our invention, we claim as new and desire to secure by Letters Patent—

The combination of the shaft, a clutch-disk fastened thereto and sustained thereby, a pulley having a hollow web receiving the clutch-disk said web having a hub on each side of the disk, the hubs being loosely mounted on the shaft, whereby the entire weight of the pulley is sustained by the shaft, a clutch member carried by the pulley and working with the periphery of the disk, and means for operating the clutch member.

In testimony whereof we have signed our names to this specification in the presence of two subscribing witnesses.

THOMAS J. O'BRIEN.
HOMER L. ALLEN.

Witnesses:
WM. N. BUTLER,
HOOKER V. HARRISON.